United States Patent Office 3,538,018
Patented Nov. 3, 1970

3,538,018
BINARY SUPPORT SYSTEM FOR FLUIDIZED
CATALYSTS
Kurt Pilch and Heinrich Sperber, Ludwigshafen (Rhine), Germany, assignors to Badische Anilin- & Soda-Fabrik Aktiengesellschaft, Ludwigshafen (Rhine), Germany
No Drawing. Filed July 19, 1968, Ser. No. 745,953
Claims priority, application Germany, July 29, 1967, 1,642,934
Int. Cl. B01j 11/82
U.S. Cl. 252—435
9 Claims

ABSTRACT OF THE DISCLOSURE

An improved method of carrying out catalytic reactions in the presence of fluidized supported catalysts in the form of globules having cavities accessible from outside, the improvement consisting in the addition of carriers in the form of compact particles to the said supported catalysts. The method is suitable for example for the hydrogenation of aromatic nitro compounds and for the production of dinitriles from carboxylic acids and ammonia.

---

This invention relates to an improved method of carrying out catalytic reactions in the presence of fluidized supported catalysts.

It is known from U.S. patent specification No. 3,347,798 that catalytic reactions can be carried out in the presence of fluidized supported catalysts which have cavities accessible from the exterior. It is also known from U.K. patent specification No. 599,252 that nitrobenzene can be reduced catalytically in the presence of catalysts in a fluidized bed. The method has the disadvantage that, owing to attrition of the catalysts used, stoppages in the filtration means and the formation of deposits on heat exchange surfaces readily occur. Moreover the life of the catalysts used does not satisfy industrial requirements.

It is an object of this invention to provide an improved process for carrying out catalytic reactions in which the life of the catalyst is prolonged and its attrition is lessened. It is another object of the invention to provide an improved method in which stoppages and the formation of deposits due to abraded catalyst dust are avoided.

In accordance with this invention these and other objects and advantages are achieved in an improved method for carrying out catalytic reactions in the presence of fluidized supported catalysts in the form of globules having cavities accessible from outside, wherein the improvement consists in adding carriers in the form of compact particles to the said supported catalysts.

The method is suitable for example for the hydrogenation of unsaturated compounds, the reduction of aromatic nitro compounds to amines, for the production of dinitriles from carboxylic acids and ammonia, for the oxidation of aliphatic, aromatic or cycloaliphatic hydrocarbons, for the dehydrogenation, dehydration or cracking and reforming of hydrocarbons, in a fluidized bed.

The reaction is carried out in the presence of supported catalysts in the form of globules having cavities accessible from outside. Suitable carriers include silica, alumina, silicates such as aluminum, magnesium and zirconium silicates, and titanium dioxide. Preferred supported catalysts contain 1 to 25%, particularly 2 to 20%, by weight (with reference to the whole of the catalyst) of metals or compounds which catalyze the reaction in question. Examples of suitable metals or compounds are: copper, silver, tin, vanadium, chromium, molybdenum, tungsten, manganese, iron, nickel, cobalt, platinum, palladium, phosphoric acid, phosphates or mixtures thereof. The preferred supported catalyst have to the extent of at least 80% a mean size of more than 90 microns and a maximum in the pore distribution curve of from $10^4$ to $10^5$ A., determined by the mercury method. Particularly preferred supported catalysts have cavities accessible from outside having a total volume of 0.05 to 3, particularly 0.07 to 0.15 cm.$^3$/g. Suitable supported catalysts are obtained for example by the method described in U.S. patent specification No. 3,347,798.

Carriers in the form of compact particles are added to the globular supported catalysts having cavities accessible from outside. It is advantageous to use the same carrier as in the catalysts described above. It is also advantageous for the carriers to differ in bulk density by not more than 100 g./l., particularly 50 g./l. The compact carrier preferably contains the amounts of active metals or compounds specified for the abovementioned supported catalysts.

It is advantageous to add 10 to 60%, particularly 10 to 20%, by weight of compact carrier (with reference to the said supported catalysts) to the supported catalysts which are in the form of globules having cavities accessible from outside.

The mixture of supported catalyst in the form of globules having cavities accessible from outside and the carrier in the form of compact particles is kept in fluidized motion during the reaction, i.e. it is used in a fluidized bed.

The new method has acquired particular importance in the reduction of nitrobenzene or nitrotoluenes. Preferred nitrotoluenes are o-nitrotoluene and p-nitrotoluene. Nitrobenzene or nitrotoluenes and hydrogen are advantageously used in a molar ratio of 1:10 to 1:50, particularly from 1:20 to 1:40. The reaction is preferably carried out at temperatures of from 250° to 300° C., particularly from 270° to 300° C. It is possible to carry out the reaction at atmospheric pressure. It is advantageous to use slightly superatmospheric pressure, for example up to 10 atmospheres. The supported catalysts in the form of globules having cavities accessible from outside contain copper in the abovementioned amounts as the catalytically active substance.

Another preferred method is the reaction of dicarboxylic acids with ammonia to form dinitriles. It is preferred to use aliphatic dicarboxylic acids having three to twelve carbon atoms in the molecule. Aliphatic α, ω-dicarboxylic acids having four to ten carbon atoms which have hydrocarbon structure apart from the carboxyl groups have acquired special industrial importance. It is advantageous to use 500 to 1500, particularly 800 to 1200 parts by volume (STP) of gaseous ammonia for each part by weight of dicarboxylic acid. The reaction is generally carried out at temperatures of 300° to 450° C. Particularly good results are obtained when temperatures of from 350° to 420° C. are used. It is possible to carry out the reaction at atmospheric pressure, but it is advantageous to use slightly super-atmospheric pressure, for example up to 10 atmospheres. The supported catalysts in the form of globules having cavities accessible from outside advantageously contain 5 to 15%, particularly 7 to 12%, by weight of phosphoric acid as the catalytically active substance.

To illustrate the process according to this invention, the reduction of nitrobenzene or nitrotoluenes to the corresponding amines is now described by way of example. The process may be carried out for example by placing the supported catalyst which is in the form of globules having cavities accessible from outside and containing the specified amount of copper together with the said compact carrier particles in the said ratio in a tube on a gas-permeable plate and blowing, at the said temperature and pressure conditions, nitrobenzene or a nitrotoluene and hydrogen in the said ratio upwardly through the same. Entrained particles of catalyst are separated from the reaction gas by filtering equipment such as cyclones or filter candles. The amine formed is condensed by cooling and the excess hydrogen is advantageously returned to the reaction.

The invention is illustrated by the following examples in which the parts specified are by weight unless stated otherwise. They bear the same relation to parts by volume as the kilogram to the liter.

EXAMPLE 1

A grate is provided at the lower end of a cylindrical reactor having a diameter of 2 m. and a height of 8 m. 5000 parts by volume of a catalyst is placed on the grate. The catalyst consists of 80% by weight of hollow silica globules having a copper content of 20% by weight and prepared by the method described in U.S. patent specification No. 3,347,798 and 20% by weight of compact particles of silica having a diameter of more than 90 microns and a copper content of 20% by weight. Cooling tubes having a total cooling area of 90 m.$^2$ are provided in the reactor. Six two-fluid nozzles are provided in the wall of the reactor at each of the levels 0.5, 1 and 1.5 meters. A total of 1400 parts of nitrobenzene and $1.35 \times 10^6$ parts by volume of hydrogen are introduced per hour together through the nozzles at a temperature of 280° to 290° C. and a pressure of 5 atomsperes. Another $5.35 \times 10^6$ parts by volume of recycled hydrogen and $0.950 \times 10^6$ parts by volume of fresh hydrogen is passed upwards through the grate and through the bed of catalyst. The catalyst is fluidized by the introduction of the gas. The reaction gas escaping at the top of the reactor is filtered through filter candles and passed through a heat exchanger where aniline separates. Excess hydrogen is returned to the reaction. 1054 parts per hour of aniline having a boiling point of 184° C. is obtained. The yield is 99.5% of the theory. It is necessary to regenerate the catalyst after the passage of $2.5 \times 10^6$ parts of nitrobenzene.

EXAMPLE 2

The reaction is carried out as described in Example 1, but a catalyst is used consisting exclusively of the globules having cavities used in Example 1. The catalyst has to be regenerated after the passage of $1.2 \times 10^6$ parts of nitrobenzene.

EXAMPLE 3

The reaction is carried out as described in Example 1, but a catalyst is used which consists exclusively of the compact particles of silica. The catalyst has to be regenerated after the passage of $0.25 \times 10^6$ parts of nitrobenzene.

EXAMPLE 4

4 parts by volume of a catalyst of hollow globules having a phosphoric acid content of 10% by weight and prepared according to the process described in German patent specification No. 1,188,578 is placed in a vertical reactor having a diameter of 100 mm. and a length of 1200 mm. The bed of catalyst is heated to a temperature of 380° to 400° C. by electrical heating and it is kept in fluidized motion by a stream of 900 parts by volume per hour of ammonia preheated to 200° to 400° C. 1 part per hour of adipic acid together with 800 parts by volume of ammonia per hour are passed into the fluidized bed. The reaction products are condensed after leaving the reactor. The organic layer is separated and the aqueous layer is extracted with toluene. The extract and the organic layer are noted and distilled. 0.755 part of a crude adiponitrile containing water is obtained per hour. This is distilled under subatmospheric pressure at 10 mm. Hg. Pure adiponitrile is obtained in an amount of 95% of the theory (with reference to adipic acid supplied) between 130° and 180° C. After 115 hours the activity of the catalyst declines. It is regenerated with a current of air at a temperature of 500° C.

EXAMPLE 5

The procedure described in Example 4 is adopted but 15% of compact silicic acid gel particles having a diameter of 0.1 to 0.3 mm. and a phosphoric acid content of 10% by weight is added to the catalyst. The activity of the catalyst does not decline until after 150 hours.

We claim:
1. A catalyst composition useful in fluidized-bed reactions comprising a mixture of a particulate catalyst support in the form of globules having to the extent of at least 80% a mean particle size of 90 microns and having internal cavities in said globules accessible from the outside thereof with a total volume in said cavities of 0.05 to 3 cubic centimeters per gram, and 10 to 60% by weight, with reference to said particulate catalyst support, of a compact, particulate catalyst carrier having a bulk density differing not more than 100 grams per liter from the bulk density of said particulate catalyst support.
2. A catalyst composition as claimed in claim 1, wherein said percent of said compact catalyst carrier is 10 to 20% by weight.
3. A catalyst composition as claimed in claim 1, wherein said particulate catalyst support bears 1 to 25% by weight of a catalytic metal or catalytic compound.
4. A catalyst composition as claimed in claim 1, whereing said particulate catalyst support has a maximum in its pore distribution curve, as determined by the mercury method, of $10^4$ to $10^5$ A.
5. A catalyst composition as claimed in claim 1, wherein said volume of said cavities is 0.07 to 0.15 cubic centimeters per gram.
6. A catalyst composition as claimed in claim 1, wherein said compact carrier has a bulk density differing not more than 50 grams per liter from the bulk density of said particulate catalyst support.
7. A catalyst composition as claimed in claim 1, wherein the particles of said catalyst composition carry as catalytic metals 1–25% by weight of said composition of at least one of copper, silver, tin, vanadium, chromium, molybdenum, tungsten, manganese, iron, nickel, cobalt, platinum and palladium.
8. A catalyst composition as claimed in claim 1, wherein the particles of said catalyst composition carry as a catalytic compound 1–25% by weight of said composition of at least one of phosphoric acid and a phosphate.
9. A catalyst composition as claimed in claim 1, wherein said compact carrier contains a catalytic metal or compound for catalyzing the reaction in which said catalyst composition is used.

References Cited

UNITED STATES PATENTS

| | | | |
|---|---|---|---|
| 2,794,043 | 5/1957 | Jansen | 260—465.2 |
| 3,347,798 | 6/1967 | Barr | 252—448 |
| 3,324,165 | 10/1967 | Barr | 260—465.2 |

DANIEL E. WYMAN, Primary Examiner

P. M. FRENCH, Assistant Examiner

U.S. Cl. X.R.

252—477, 448; 260—465.2

PO-1050
(5/69)

UNITED STATES PATENT OFFICE
CERTIFICATE OF CORRECTION

Patent No. 3,538,018      Dated November 03, 1970

Inventor(s) Kurt Pilch et al

It is certified that error appears in the above-identified patent and that said Letters Patent are hereby corrected as shown below:

Column 1, line 71, "catalyst" should read -- catalysts --.

Column 3, line 26, "atomsperes" should read -- atmospheres --; line 54 "hollow globules" should read -- hollow silica globules --; line 69, "noted" should read -- united --.

Column 4, line 33, "ing" should read -- in --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents